(12) United States Patent
Teshima et al.

(10) Patent No.: US 12,492,135 B2
(45) Date of Patent: Dec. 9, 2025

(54) LAYERED DOUBLE HYDROXIDE CRYSTAL, ANION ADSORBENT, AND METHOD FOR PRODUCING LAYERED DOUBLE HYDROXIDE CRYSTAL

(71) Applicant: Shinshu University, Matsumoto (JP)

(72) Inventors: Katsuya Teshima, Nagano (JP); Tomohito Sudare, Nagano (JP)

(73) Assignee: Shinshu University, Matsumoto (JP)

( * ) Notice: Subject to any disclaimer, the term of this patent is extended or adjusted under 35 U.S.C. 154(b) by 676 days.

(21) Appl. No.: 17/633,682

(22) PCT Filed: Aug. 20, 2020

(86) PCT No.: PCT/JP2020/031456
§ 371 (c)(1),
(2) Date: Feb. 8, 2022

(87) PCT Pub. No.: WO2021/039584
PCT Pub. Date: Mar. 4, 2021

(65) Prior Publication Data
US 2022/0315452 A1 Oct. 6, 2022

(30) Foreign Application Priority Data

Aug. 23, 2019 (JP) ................................. 2019-152525

(51) Int. Cl.
*C02F 1/42* (2023.01)
*B01J 41/10* (2006.01)
(Continued)

(52) U.S. Cl.
CPC ................. *C02F 1/42* (2013.01); *B01J 41/10* (2013.01); *C30B 9/04* (2013.01);
(Continued)

(58) Field of Classification Search
CPC ... B01J 20/06; B01J 20/30; B01J 41/02; B01J 41/10; C01G 53/00; C02F 1/281;
(Continued)

(56) References Cited

U.S. PATENT DOCUMENTS

| | | |
|---|---|---|
| 2013/0313476 A1 | 11/2013 | Iyi |
| 2016/0009566 A1 | 1/2016 | Lin |
| 2018/0073153 A1* | 3/2018 | Yamada ................ C25B 11/057 |

FOREIGN PATENT DOCUMENTS

| | | |
|---|---|---|
| CN | 106892407 A | 6/2017 |
| JP | 2008029985 A | 2/2008 |

(Continued)

OTHER PUBLICATIONS

Carrasco et al., "Chemistry of Materials", Jul. 8, 2019, vol. 31, pp. 6798-6807.
(Continued)

*Primary Examiner* — Dirk R Bass
(74) *Attorney, Agent, or Firm* — McDonnell Boehnen Hulbert & Berghoff LLP

(57) ABSTRACT

What is provided is a layered double hydroxide crystal for achieving higher ion-exchange capacity than that of the related art.
The layered double hydroxide crystal 1 according to the present embodiment is represented by Formula (1) and composed of a plurality of crystal grains 10 each of which has a lamination structure in which a plurality of plate-shaped crystals (11), (11), . . . are laminated, in which particle sizes of the plurality of crystal grains (10), (10), . . . are uniform on a microscale.

$$[Ni^{2+}{}_{1-x}Fe^{3+}{}_x(OH)_2]\cdot[(Cl^-)_{x/2}] \qquad (1)$$

(Where, $0.25 < x \leq 0.9$)

5 Claims, 5 Drawing Sheets

(51) Int. Cl.
*C30B 9/04* (2006.01)
*C02F 101/10* (2006.01)
*C02F 101/12* (2006.01)

(52) U.S. Cl.
CPC .. *C02F 2101/101* (2013.01); *C02F 2101/103* (2013.01); *C02F 2101/12* (2013.01)

(58) Field of Classification Search
CPC .............. C02F 1/42; C02F 2101/101; C02F 2101/103; C02F 2101/12; C02F 2101/163; C30B 9/04
See application file for complete search history.

(56) References Cited

FOREIGN PATENT DOCUMENTS

| | | | |
|---|---|---|---|
| JP | 2008222474 A | 9/2008 | |
| JP | 2009178682 A | 8/2009 | |

OTHER PUBLICATIONS

Xu et al., The Journal of Physical Chemistry C, Jan. 16, 2017, vol. 121, pp. 2683-2695.
Tamura et al., Flux Growth of Highly Laminated Ni—Co LDH Crystals toward High Efficient Removal of Toxic Anion In Water, Lecture preprints of the 31st fall meeting of the ceramic society of Japan, Aug. 27, 2018, 1PH18.
Sudare et al., Nitrate ion adsorption of flux-grown NiCo-LDHs crystals, Abstracts of the 33th Presentations of The Japan Society on Adsorption, Japan, Nov. 14, 2019, p. 43.
International Search Report for corresponding PCT application No. PCT/JP2020/031456, dated Nov. 2, 2020.
Notice of Allowance for corresponding Japanese application No. 2021-542811, dated Sep. 21, 2021.
Korean Office Action for Korean application No. 10-20223-7005824.
Korean Office Action for Korean application No. 10-2022-7005824.

* cited by examiner

LAYERED DOUBLE HYDROXIDE CRYSTAL, ANION ADSORBENT, AND METHOD FOR PRODUCING LAYERED DOUBLE HYDROXIDE CRYSTAL

TECHNICAL FIELD

The present invention relates to a layered double hydroxide crystal, an anion adsorbent, and a method for producing the layered double hydroxide crystal, and particularly to a layered double hydroxide crystal for removing harmful anions in water or ground.

Priority is claimed on Japanese Patent Application No. 2019-152525, filed Aug. 23, 2019, the content of which is incorporated herein by reference.

BACKGROUND ART

Layered double hydroxides (LDHs) are anion-exchangeable inorganic ion exchangers, and layered inorganic compounds with a structure in which a metal oxide (host layer), and anion species and water molecules (guest layer) are alternately laminated. Since the anion species in the guest layer can be exchanged with the anion species in a solution while maintaining the layered structure, it has been known that highly selective ion-exchange properties with an interlayer (two-dimensional space).

In the related art, the selective ion-exchange properties of LDHs have been widely discussed, and for example, as an adsorbent capable of simultaneously and selectively adsorbing nitrate ions, phosphorus, and arsenic from an aqueous solution, an adsorbent containing Mg—Al-based hydrotalcite has been devised (see Patent Document 1).

CITATION LIST

Patent Document

[Patent Document 1]
Japanese Unexamined Patent Application, First Publication No. 2009-178682

SUMMARY OF INVENTION

Technical Problem

Currently, since it is difficult for more than 1.1 billion people around the world to obtain safe drinking water and large-scale natural disasters have been on the rise in recent years, there is an urgent need to secure safe water in the event of an emergency when a disaster occurs, but concrete solution has yet been found. The background to such social problems is that industrial wastewater causes soil contamination in various countries and regions, or that agricultural fertilizers are mixed into groundwater due to spray of the agricultural fertilizers. In particular, harmful anion species such as fluoride ions and arsenide ions that are generated from industrial wastewater and agricultural fertilizers accumulate in the human body to be affected, so that layered double hydroxides capable of sufficiently removing the harmful anion species have been demanded.

By contrast, in a precipitation method that is general synthesis means for obtaining LDH crystals, as described above, a synthesis temperature is relatively low, about room temperature to 80° C., the crystals cannot grow sufficiently, and many nm-sized crystal grains are formed. Accordingly, there is a problem that crystal grains tend to agglomerate with each other in water or a moist atmosphere, and as a result, the ion-exchange capacity of LDHs decreases, and sufficient ion-exchange capacity cannot be obtained.

In emerging countries where the acquisition of safe drinking water is urgently needed, in a case where the metal used as a raw material for LDH crystals is scarce, it is difficult to industrially produce LDH crystals since it is difficult to obtain the metal and the manufacturing cost thus increases. For example, in Tanzania, Africa, it is extremely difficult to mass-produce LDH crystals by using cobalt since cobalt is rare and expensive. Therefore, there is a strong demand for LDH crystals that can be produced at low cost by substituting metals difficult to be available, such as cobalt, with easily available metals, such as iron.

An object of the present invention is to provide a layered double hydroxide crystal capable of achieving low cost while achieving high ion-exchange capacity for a specific anion species, an anion adsorbent, and a method for producing the layered double hydroxide crystal.

Solution to Problem

As a result of diligent studies, the present inventor has found that a precursor crystal with a flat lamination structure different from that of the related art can be produced by the production of a precursor crystal with a solid state reaction method in which an inexpensive and easily available Fe source substance. In addition, the present inventor has found that in a case where the obtained precursor crystal is subjected to hydrolysis treatment, reduction treatment, and ion-exchange treatment, the flat lamination structure of the precursor crystal is maintained, and as a result, layered double hydroxide crystals with a flat lamination structure can be obtained with high dispersibility. In particular, the present inventor has found that the obtained layered double hydroxide crystals have extremely high ion-exchange capacity with respect to specific anion species such as fluoride ions and arsenide ions.

That is, the gist configuration of the present invention is as follows.

[1] A layered double hydroxide crystal represented by Formula (1) containing:
a plurality of crystal grains,
wherein each of the plurality of crystal grains has a lamination structure in which a plurality of plate-shaped crystals are laminated, and
particle sizes of the plurality of crystal grains are uniform on a microscale $$[Ni^{2+}{}_{1-x}Fe^{3+}{}_x(OH)_2] \cdot [(Cl^-)_{x/2}] \qquad (1),$$

(where, $0.25 < x \leq 0.9$).

[2] The layered double hydroxide crystal according to [1], in which an interlayer space is formed between adjacent plate-shaped crystals, and
the plurality of plate-shaped crystals and a plurality of the interlayer spaces are alternately arranged.

[3] An anion adsorbent containing the layered double hydroxide crystal according to [1] or [2].

[4] The anion adsorbent according to [3], in which the anion adsorbent adsorbs one or two or more kinds of anions selected from the group consisting of fluoride ions, sulfate ions, and arsenide ions.

[5] A method for producing a layered double hydroxide crystal including:
a step of preparing, as a raw material, a mixture of a Ni source substance, a Fe source substance, and a Na source substance which are mixed based on a precursor crystal stoichiometric proportion;

a step of heating the raw material at 600° C. to 1000° C. for 1 hour or longer to produce precursor crystals composed of $NaNi_{1-x}Fe_xO_2$ crystals ($0.25<x\leq0.9$);

a step of hydrolyzing the precursor crystals;

a step of carrying out a reduction treatment on crystals obtained by the hydrolysis of the precursor crystals; and a step of substituting a carbonate ion positioned on an interlayer between the crystals obtained by the reduction treatment with a chloride ion.

Advantageous Effects of Invention

According to the present invention, it is possible to provide the layered double hydroxide crystal for achieving low cost while achieving high ion-exchange capacity for a specific anion species, and the method for producing the layered double hydroxide crystal.

DESCRIPTION OF EMBODIMENT

Hereinafter, an embodiment of the present invention will be described in detail with reference to the drawings.

[Configuration of Layered Double Hydroxide Crystal]

Figure 1:
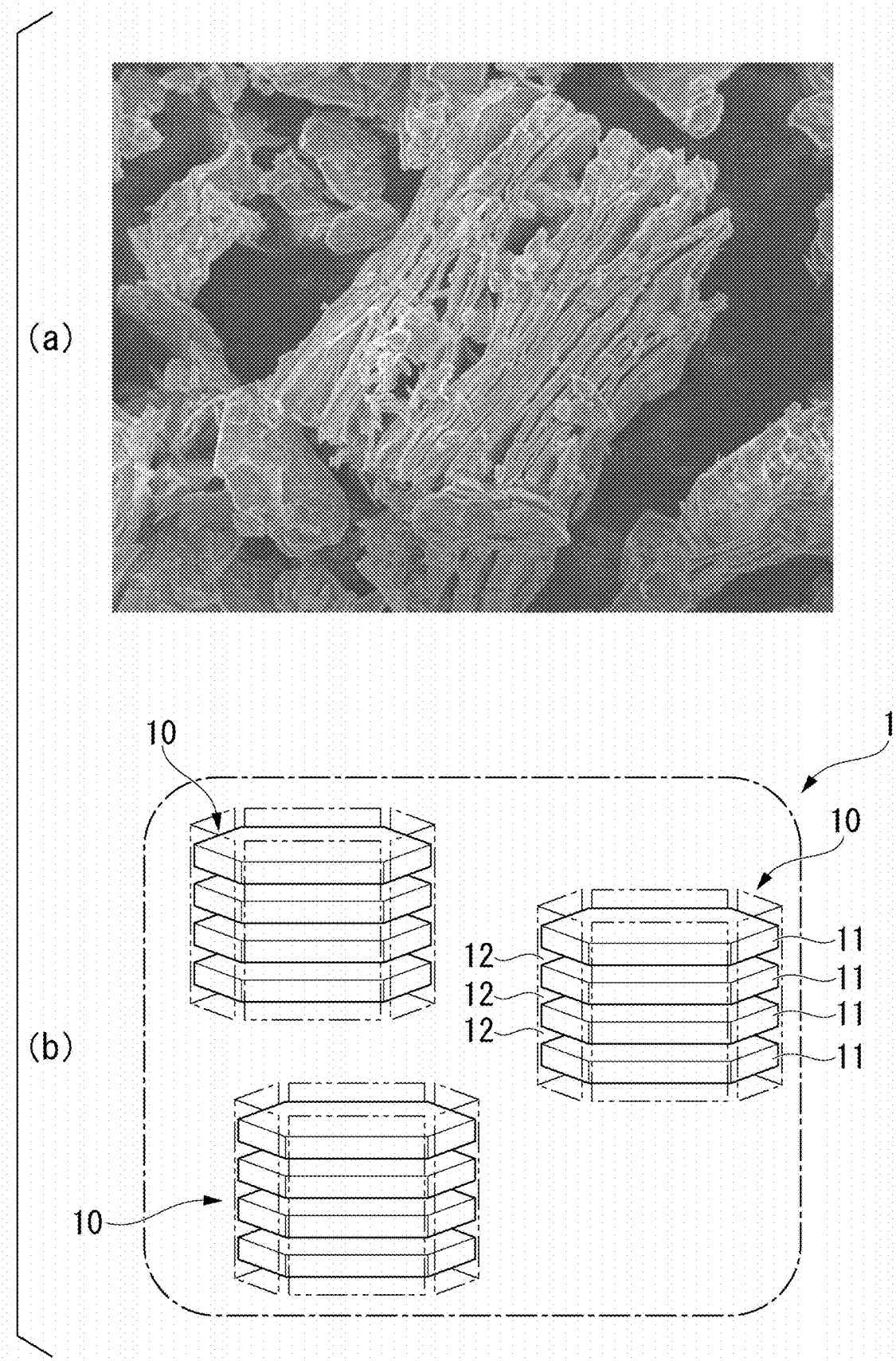
FIG. 1(a) is an electron microscope image showing a configuration of one crystal grain constituting a layered double hydroxide crystal according to an embodiment of the present invention.
FIG. 1(b) is a schematic diagram showing a configuration of a layered double hydroxide crystal.

FIG. 1(a) is an electron microscope image showing a configuration of one crystal grain constituting a layered double hydroxide crystal according to an embodiment of the present invention, and FIG. 1(b) is a schematic diagram showing a configuration of a layered double hydroxide crystal.

A layered double hydroxide crystal 1 (hereinafter, referred to as a LDH crystal) is represented by the following Formula (1) and composed of a plurality of crystal grains 10 each of which has a lamination structure in which a plurality of plate-shaped crystals 11, 11, . . . are laminated, and particle sizes of the plurality of crystal grains 10, 10, . . . are uniform on a microscale. In addition, in the present specification, a microscale means a range including a submicron range.

$$[Ni^{2+}{}_{1-x}Fe^{3+}{}_x(OH)_2]\cdot[(Cl^-)_{x/2}] \qquad (1)$$

(Where, $0.25<x\leq0.9$)

The layered double hydroxide crystal 1 may be anhydrate or a hydrate containing a small amount of water ($H_2O$).

An interlayer space 12 is formed between the plate-shaped crystals 11 and 11 adjacent to each other, and the plurality of plate-shaped crystals 11, 11, . . . and a plurality of the interlayer spaces 12, 12, . . . are alternately arranged.

In a case where each of the crystal grains 10 is magnified and observed, the plate-shaped crystals 11 can also be referred to as thin plate-shaped crystals or sheet-shaped crystals. Each of the plate-shaped crystals 11 has a thickness of submicron order, and the interlayer space 12 also has an interval of submicron order (FIG. 1(b)). Each of the crystal grains 10 has a lamination structure in which the plurality of plate-shaped crystals 11, 11, . . . are laminated in several to several tens of layers. The particle size or an equivalent circle diameter in the width direction of each of the plate-shaped crystals 11 is 0.1 µm to 300 µm, preferably 0.5 µm to 100 µm, and more preferably 1.0 µm to 50 µm.

Each of the crystal grain 10 is an anion-exchangeable inorganic ion exchanger, and can also be referred to as a layered inorganic compound with a structure in which a host layer (metal hydroxide), and a guest layer (anion species and water molecules) are alternately laminated. Since the anion species in the guest layer can be exchanged with the anion species in a solution while maintaining a layered structure, highly selective ion-exchange properties with an interlayer (referred to as two-dimensional space) are exhibited.

In the above Formula (1), $Ni^{2+}$ is not limited to all substitutions, but partial substitutions may be adopted. In addition, $Fe^{3+}$ is not limited to all substitutions, but partial substitutions may be adopted.

The range of x in the above Formula (1) is preferably $0.5\leq x\leq0.85$, and more preferably $0.6\leq x\leq0.8$. In this case, the amount of $Ni^{2+}$ in the layered double hydroxide crystal is further reduced. Therefore, a small amount of a Ni source substance used during the production can be used, and the production cost of the layered double hydroxide crystal 1 can be further reduced.

[Method for Producing Layered Double Hydroxide Crystal]

Next, a method for producing the layered double hydroxide crystal 1 will be described.

FIGS. 2(a) to 2(d) are schematic diagrams showing a method for producing the layered double hydroxide crystal according to the present embodiment.

First, as a raw material, a mixture of a Ni source substance, a Fe source substance, and a Na source substance, which are mixed based on a precursor crystal stoichiometric proportion described later, are prepared.

Examples of the Ni source substance include NiO, $Ni(OH)_2$, $Ni(NO_3)_2$, $Ni(NO_3)_2\cdot6H_2O$, $NiCO_3$, $NiSO_4$, $NiSO_4\cdot6H_2O$, $NiCl_2$, $NiCl_2\cdot6H_2O$, $(HCOO)_2Ni$, $(HCOO)_2Ni\cdot2H_2O$, $C_2O_4Ni$, $C_2O_4Ni\cdot2H_2O$, $(CH_3COO)_2Ni$, $(CH_3COO)_2Ni\cdot4H_2O$, $Ni(CH_3COCHCOCH_3)$, $Ni(CH_3COCHCOCH_3)\cdot xH_2O$, $NiCO_3$, $NiCO_3\cdot xH_2O$, $(NH_4)_2Ni(SO_4)_2$, $(NH_4)_2Ni(SO_4)_2\cdot6H_2O$, and Ni.

Examples of the Fe source substance include $Fe_2O_3$, FeO, $Fe(OH)_2$, $Fe(OH)_3$, $Fe(NO_3)_2$, $FeSO_4$, $Fe_2(SO_4)_3$, $FeCl_2$, $FeCl_3$, $FeC_2O_4$, $Fe_2(C_2O_4)_3$, $Fe(CH_3COO)_2$, $Fe_2(CH_3$ COO)$_3$, Fe(CH$_3$COCHCOCH$_3$), Fe$_2$(CH$_3$COCHCOCH$_3$)$_3$, FeCO$_3$, Fe$_2$(CO$_3$)$_3$, (NH$_4$)$_2$Fe(SO$_4$)$_2$, (NH$_4$)$_2$Fe$_2$(SO$_4$)$_3$, and hydrates of these, and Fe.

Examples of the Na source substance include NaNO$_3$, Na$_2$CO$_3$, Na$_2$SO$_4$, Na$_2$SO$_4$.10H$_2$O, Na$_2$SO$_3$, NaCl, CH$_3$COONa, CH$_3$COONa, CH$_3$COONa.3H$_2$O, C$_2$O$_4$Na$_2$, C$_6$H$_5$Na$_3$O$_7$, C$_6$H$_5$Na$_3$O$_7$.2H$_2$O, and NaHCO$_3$.

Figure 2:
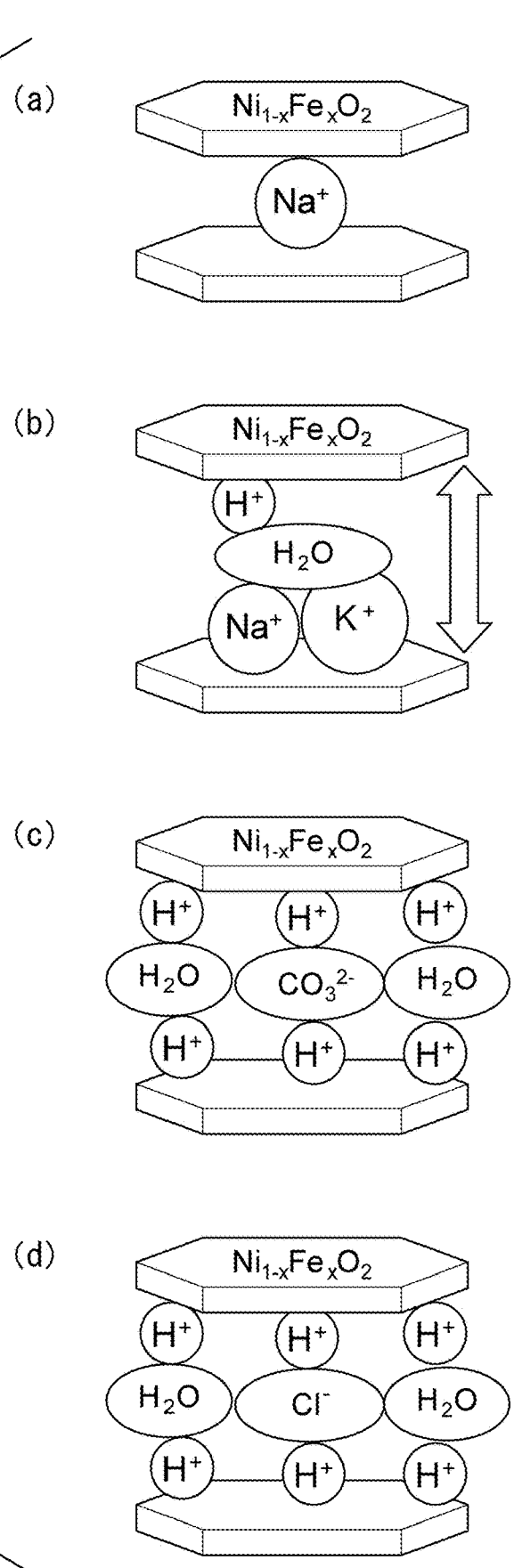
FIGS. 2(a) to 2(d) are schematic diagrams showing a method for producing the layered double hydroxide crystal according to the present embodiment.

Next, the above-described raw material is heated at 600° C. to 1000° C. for 1 hour or longer to produce precursor crystals composed of NaNi$_{1-x}$Fe$_x$O$_2$ crystals (0.25<x≤0.9) (FIG. 2(a)). Such a method of growing crystals using a high-temperature molten salt can be referred to as a solid state reaction (SSR) method, and in the present embodiment, precursor crystals are produced by the solid state reaction method. As the precursor crystals, NaNi$_{1-x}$Fe$_x$O$_2$ crystals can be produced so as to preferably satisfy 0.5<x≤0.85, and more preferably 0.6<x≤0.80. As a result, highly crystalline particles with developed self-shape can be grown on micro order, and precursor crystals each of which has a lamination structure in which a plurality of plate-shaped crystals are laminated can be obtained.

In this heat treatment step, specifically, the above-described raw material can be heated, held, and cooled to produce the above described precursor crystals. Heating and cooling conditions in this heat treatment step are not particularly limited, but for example, the heating rate may be 45° C./h to 1600° C./h, the holding temperature may be 700° C. to 1000° C., the holding time may be 0.1 to 20 hours, the cooling rate may be 0.1° C./h to 60000° C./h, the stop temperature may be 500° C. or lower, and the cooling temperature may be, for example, room temperature.

Thereafter, each of the precursor crystals composed of NaNi$_{1-x}$Fe$_x$O$_2$ crystals is hydrolyzed (FIG. 2(b)). The method of hydrolysis treatment is not particularly limited, and for example, the above-described precursor crystals can be oxidatively hydrolyzed using an alkali. By this hydrolysis treatment step, the distance between plate-shaped crystals adjacent to each other is expanded while the shapes of the plurality of plate-shaped crystals in the precursor crystals are maintained.

Next, crystals obtained by the hydrolysis of each precursor crystal are subjected to a reduction treatment (FIG. 2(c)). The method of the reduction treatment is not particularly limited, and for example, the reduction treatment can be carried out using strong acid salts and strong alkali salts. By this reduction treatment step, carbonate ions are held between metal hydroxide layers while the shapes and positions of the plurality of plate-shaped crystals after the hydrolysis treatment is carried out are maintained. Therefore, a crystal grain that has the layered double hydroxide crystals each of which is represented by the above Formula (1) can be obtained.

Thereafter, carbonate ions positioned on an interlayer between the crystals obtained by the reduction treatment are subjected to a substitution treatment with chloride ions (FIG. 2(d)). The method of this substitution treatment is not particularly limited, but for example, the substitution treatment can be carried out by using an acid such as hydrochloric acid. By this reduction treatment step, chloride ions are held between metal hydroxide layers while the shapes and positions of the plurality of plate-shaped crystals after the substitution treatment is carried out are maintained. Therefore, a crystal grain that has the layered double hydroxide crystals each of which is represented by the above Formula (1) can be obtained.

As described above, according to the present embodiment, the layered double hydroxide crystal 1 is represented by the above Formula (1) and composed of the plurality of crystal grains 10 each of which has the lamination structure in which the plurality of plate-shaped crystals 11 are laminated, and the particle sizes of the plurality of crystal grains 10, 10, . . . are uniform on a microscale. Therefore, the layered double hydroxide crystal 1 has higher dispersibility than that of the related art, and according to this, high ion-exchange capacity can be achieved. Thus, the crystal grains 10 are less likely to agglomerate with each other even in, for example, water or a moist atmosphere, and as a result, the ion-exchange capacity of the layered double hydroxide crystal 1 is increased, and sufficient ion-exchange capacity can be obtained. In particular, harmful anion species such as fluoride ions and arsenide ions generated from industrial wastewater and agricultural fertilizer can be easily and sufficiently removed.

In addition, according to the present embodiment, since the precursor crystals composed of NaNi$_{1-x}$Fe$_x$O$_2$ crystals (0.25<x≤0.9) are produced by heating the raw material composed of a mixture of a Ni source substance, a Fe source substance, and a Na source substance, which are mixed based on a precursor crystal stoichiometric proportion at 600° C. to 1000° C., for 1 hour or longer, the precursor crystals having higher dispersibility than that of the related art can be grown on a microscale, and as a result, the layered double hydroxide crystal 1 having higher ion-exchange capacity than that of the related art can be produced.

EXAMPLES

Hereinafter, Examples of the present invention will be described. The present invention is not limited to the following Examples.

First, NaNi$_{0.7}$Fe$_{0.3}$O$_2$ crystals, which are precursor crystals, were produced by the solid state reaction method. As starting raw materials, a mixture obtained by mixing NiO, Fe$_2$O$_3$, and NaNO$_3$ according to the stoichiometric proportion was used.

After each raw material prepared as described above was dry-mixed, an alumina crucible was filled with the mixture, and the mixture was heated in a muffle furnace at an increasing temperature of 500° C./h and a holding temperature of 800° C. for a holding time of 10 hours, and thereafter, the mixture was cooled at a cooling rate of 200° C./h and a stop temperature of 500° C. to obtain NaNi$_{0.7}$Fe$_{0.3}$O$_2$ crystals. The obtained powder was subjected to an oxidative hydrolysis treatment with a 2.1 Mol/L NaClO solution and a 2.0 Mol/L KOH solution at a solid-liquid ratio of 0.1 L/g for a stirring time of 24 hours. Thereafter, the obtained crystals were subjected to a reduction treatment three times with a 0.02 Mol/L H$_2$O$_2$ solution and 0.02 Mol/L NaCl solution at a solid-liquid ratio of 0.1 L/g for a stirring time of 24 hours. Furthermore, substitution treatment was carried out by using a 1.0 Mol NaCl aqueous solution and a 3.2 mMol HCl aqueous solution at a solid-liquid ratio of 0.1 L/g for a reaction time of 24 hours to obtain LDH crystals of Example 1, each of which is represented by the above Formula (1).

The LDH crystals of Example 1 obtained as described above were measured and evaluated by the following method.

(Structure of LDH Crystal)

Regarding Example 1, each of crystal structures of the precursor crystals, the crystals after the reduction treatment, and the crystals after the chloride ion substitution (LDH crystals) was identified by an XRD apparatus ("MiniFlexII", manufactured by Rigaku Corporation) with a powder X-ray diffraction (XRD) method.

(Particle Size Distribution of LDH Crystals)

The LDH crystals of Example 1 were dispersed in distilled water, and the particle size distribution of the LDH crystals was measured by using a particle size distribution measuring device (manufactured by Shimadzu Corporation, product name "SALD-7100").

(Evaluation (1) of Ion-Exchange Capacity)

The anion-exchange performance of the LDH crystals of Example 1 was evaluated by using fluoride ions under the following conditions. The obtained LDH crystals were immersed in an aqueous NaF solution and stirred at 25° C. for 24 hours with a cool stirrer. In this case, the initial concentration of fluoride ions was 8 ppm, the pH was 6 or lower, the solid-liquid ratio was 1.0 g/L, an adsorption time was 180 minutes or shorter, and the adsorption temperature was room temperature. After the immersion, the powder was separated from the above aqueous solution, and the concentration of fluoride ions in a supernatant was quantified by a suppressor-type ion chromatograph ("HIC-SP", manufactured by Shimadzu Corporation). The change over time of the concentration (ppm) of fluoride ions at this time was measured.

(Evaluation of Repeated Use)

Repeated use during anion-exchange with the LDH crystals of Example 1 was evaluated by using fluoride ions under the following conditions. The obtained LDH crystals were immersed in an aqueous NaF solution and stirred at 25° C. for 24 hours with a cool stirrer. In this case, as adsorption conditions, the initial concentration of fluoride ions was 8 ppm, the pH was about 8, a solid-liquid ratio was 1.0 g/L, the adsorption time was 60 minutes, and the adsorption temperature was room temperature. As regeneration conditions, the initial concentration of chloride ions was 5 Mol/L, the solid-liquid ratio was 1.0 g/L, the reaction time was 24 hours, and the reaction temperature was room temperature. The adsorption and regeneration cycle was repeated 6 times, and after adsorption in each of first to sixth cycles, the powder was separated from the above described aqueous solution, the concentration of fluoride ions in the supernatant was quantified by a suppressor-type ion chromatograph ("HIC-SP", manufactured by Shimadzu Corporation), and the removal rate of fluoride ions in each cycle was determined from the value of the initial concentration.

Figure 3:
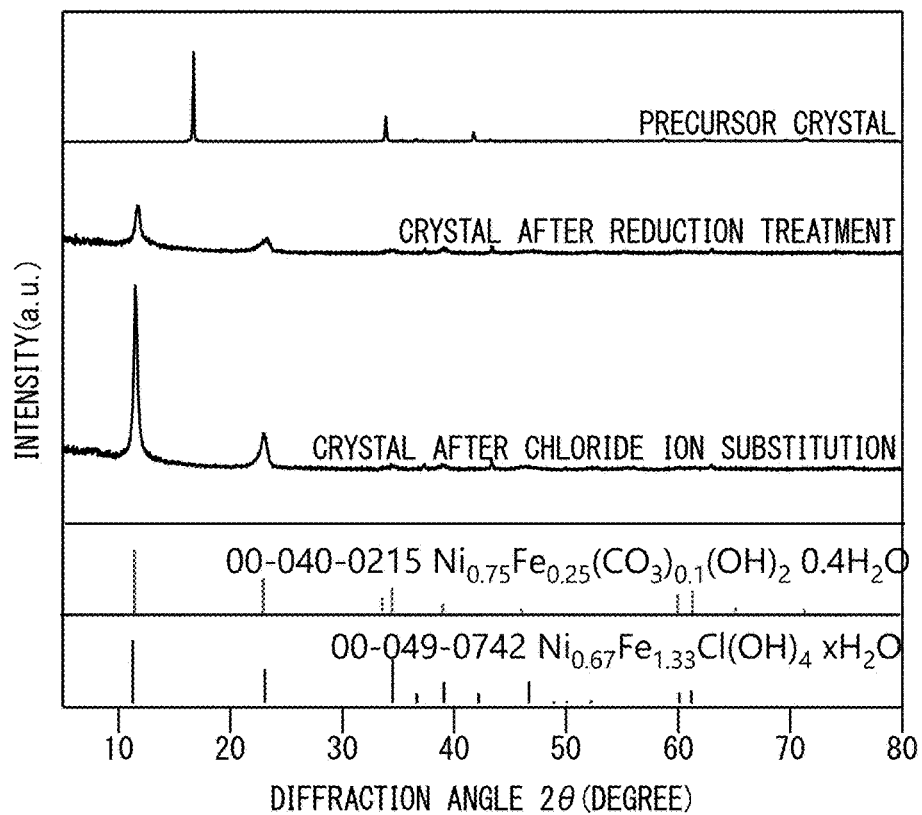
FIG. 3 is a graph showing measurement results of diffraction intensities of precursor crystals, crystals after reduction treatment, and crystals after chloride ion substitution, which are obtained in Examples, with the powder X-ray diffraction (XRD) method.

First, the results of measuring diffraction intensities of the crystals obtained in each step of Example 1 by a powder X-ray diffraction (XRD) method were shown in FIG. 3.

In Example 1, it was confirmed from the diffraction line in the profile diagram that the precursor crystal grown by the solid state reaction method was subjected to reduction treatment, oxidative hydrolysis treatment three times, and substitution treatment with chloride ions to obtain LDH crystals each of which has the almost maintained lamination structure of the precursor crystal.

Figure 4:
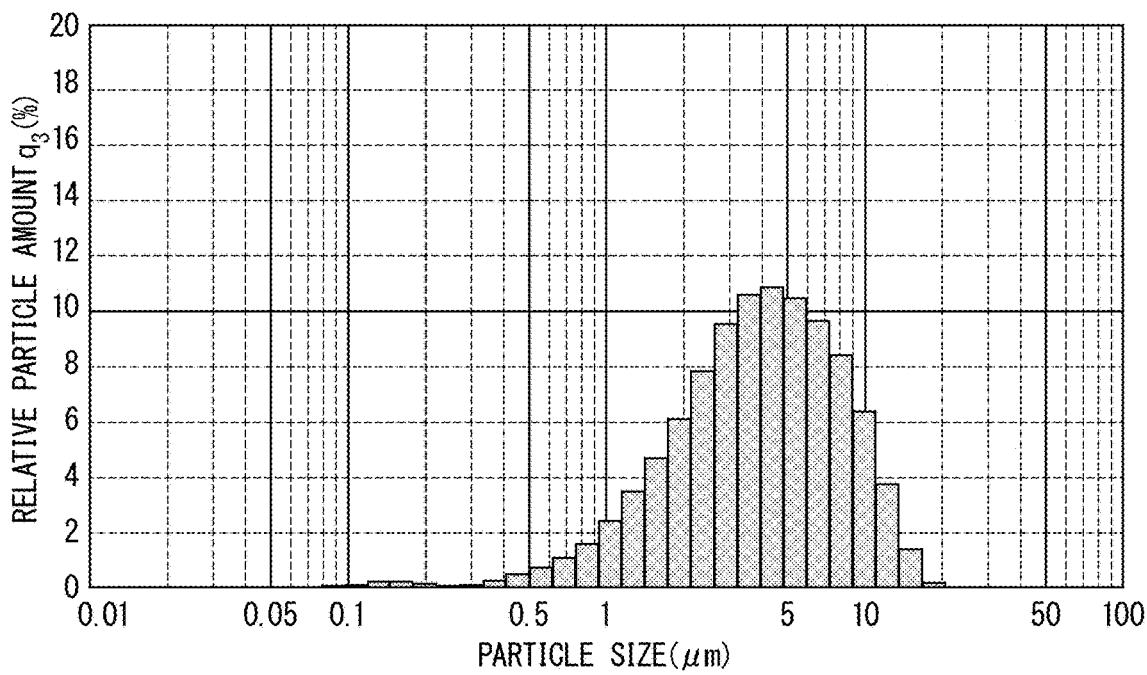
FIG. 4 is a graph showing a measurement result of a particle size distribution of layered double hydroxide crystals obtained in Examples.

The measurement results of the particle size distribution of the LDH crystals obtained in Example 1 were shown in FIG. 4.

In the LDH crystals of Example 1, the particle size is distributed in a range of 0.1 μm to 20 μm, and a relative particle amount $q_3$ shows the maximum value in a range of the particle size of 4 μm to 4.8 μm. Therefore, it was confirmed that the particle sizes of the crystal grains constituting the LDH crystals of Example 1 were uniform on a microscale.

Figure 5:
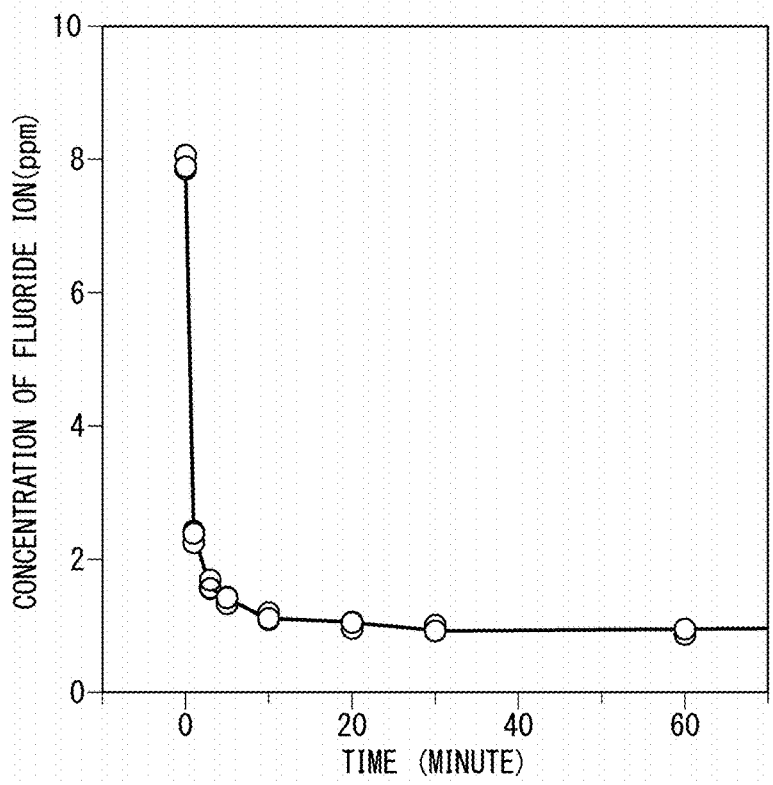
FIG. 5 is a graph showing a change over time in the concentration of fluoride ions in a case where the layered double hydroxide crystals obtained in Examples are used.

Next, the measurement result of the change over time in the concentration of fluoride ions in a case where the LDH crystals of Example 1 were used is shown in FIG. 5.

In the LDH crystals of Example 1, the concentration of fluoride ions decreased from 8.0 ppm to about 2.0 ppm within only 1 minute from the start, and decreased to 1.5 ppm or less within 5 minutes from the start. The concentration of fluoride ions 60 minutes after the start was 0.9 ppm. The amount of fluoride ions adsorbed on the LDH crystals 60 minutes after the start was measured and found to be 7.1 mg (F)/g (LDHs) (0.37 mMol (F)/g (LDHs)). Therefore, it was found that the LDH crystals of Example 1 had excellent ion-exchange capacity with respect to fluoride ions as an anion species, and exhibited the highly removing property of the fluoride ions.

Figure 6:
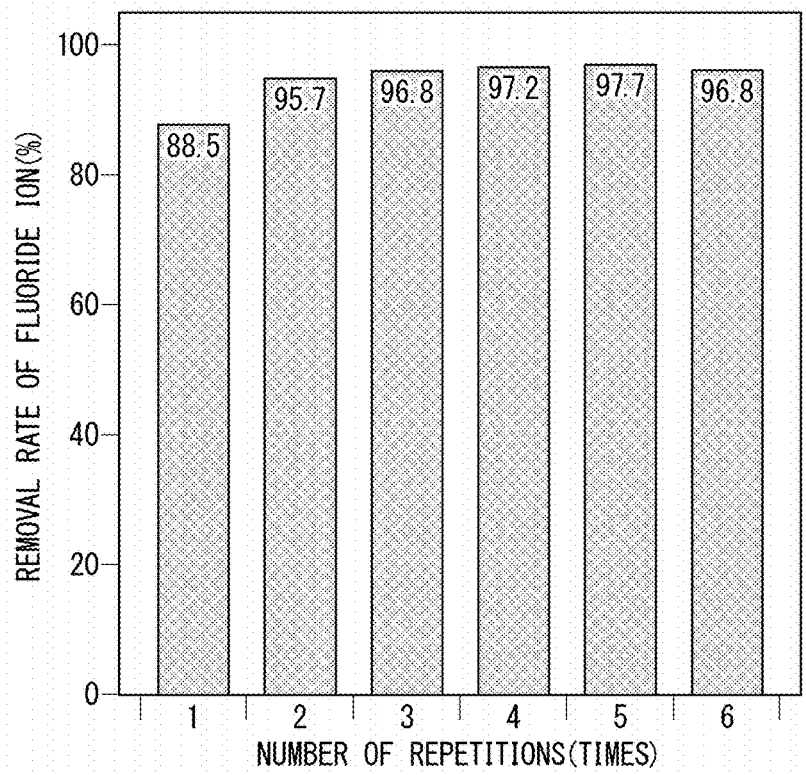
FIG. 6 is a graph showing a fluoride ion removal rate in each cycle in a case where fluoride ions are repeatedly adsorbed on the layered double hydroxide crystals obtained in Examples.

A fluoride ion removal rate in each cycle in a case where fluoride ions are repeatedly adsorbed on the LDH crystals obtained in Example 1 is shown in FIG. 6.

It was found that even in a case where the LDH crystals of Example 1 were repeatedly used 6 times, the fluoride ion removal rate was 96.8%, which shows the adsorption performance of almost 100%, the adsorption performance of the LDH crystals of Example 1 did not deteriorate even though the LDH crystals of Example 1 were repeatedly used, and the high adsorption performance (repetition performance) was maintained.

(Evaluation (2) of Ion-Exchange Capacity)

Next, the ion-exchange capacity of Example 1 was evaluated (2) by using fluoride ions, nitrate ions, sulfate ions, and arsenide ions as anions to be removed. In the fluorine test, the removal rate of fluoride ions was determined from the initial concentration value under the same conditions as in the evaluation (1) of ion-exchange capacity.

In the nitrate test, the LDH crystals of Example 1 were immersed in an aqueous $NaNO_3$ solution and stirred at 25° C. for 24 hours with a cool stirrer. The removal rate of nitrate ions was determined from an initial concentration value under the same conditions as in the evaluation (1) of ion-exchange capacity.

In the sulfate test, the LDH crystals of Example 1 were immersed in an aqueous $Na_2SO_4$ solution and stirred at 25° C. for 24 hours with a cool stirrer. The removal rate of sulfate ions was determined from an initial concentration value under the same conditions as in the evaluation (1) of ion-exchange capacity.

In the arsenic test, the test solution was prepared according to the guidelines for NSF53 arsenic-removed water specified in NSF/ANSI53 "Drinking Water Treatment Unit-Health Effects" standards literature. The crystal powder of Example 2 was charged in a predetermined vessel and made into a slurry using the arsenic test solution having an initial concentration of 0.050 mg/L. The resultant slurry was stirred by rotating the vessel for several hours. After stirring, the test solution was separated from the powder by filtration through a filter. The concentration of arsenide ions in the filtrate was quantified by the above-described suppressor-type ion chromatograph, and the arsenide ion removal rate was determined from an initial concentration value.

Figure 7:
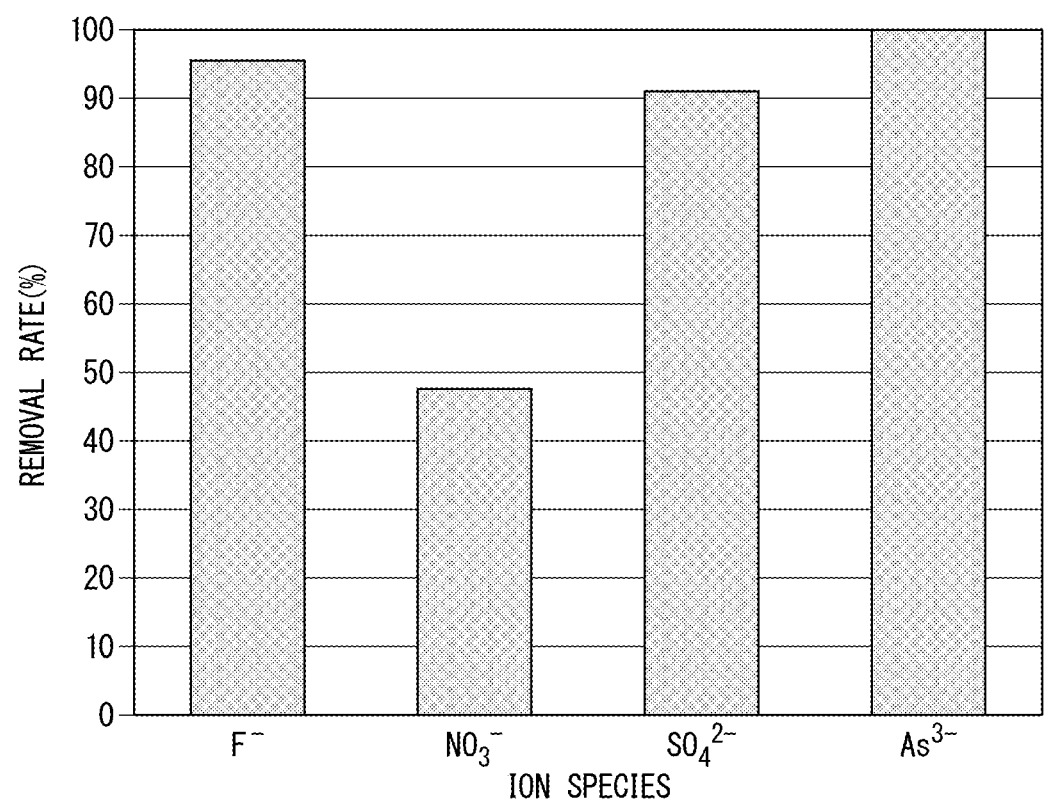
FIG. 7 is a graph showing results of determining removal rates of fluoride ions, nitrate ions, sulfate ions, and arsenide ions removed from the layered double hydroxide crystals obtained in Examples.

As shown in FIG. 7, in a case where the LDH crystals of Example 1 were used, the removal rate of fluoride ions in the supernatant in the fluorine test was 95%. The removal rate of nitrate ions in the supernatant in the nitrate test was 48%. The removal rate of sulfate ions in the supernatant in the sulfate test was 92%. In addition, no arsenide ions were detected in the filtrate, and the removal rate of arsenide ions was about 100%. Therefore, it was found that the LDH crystals of Example 1 have nitrate ion-exchange capacity, high sulfate ion-exchange capacity, and high arsenide ion-exchange capacity in addition to high fluoride ion-exchange capacity, and exhibit the highly removing property of harmful anion species. It was also found that the LDH crystals exhibit the extremely the highly removing property, particularly for fluoride ions, sulfate ions, and arsenide ions.

INDUSTRIAL APPLICABILITY

The layered double hydroxide crystal of the present invention can be used as an anion adsorbing substance for adsorbing anions. Therefore, the layered double hydroxide crystal of the present invention can be applied to the anion adsorbent used in various industrial fields.

REFERENCE SIGNS LIST

1 Layered double hydroxide crystal
10 Crystal grain
11 Plate-shaped crystal
12 Interlayer space

What is claimed is:

1. A layered double hydroxide crystal represented by Formula (1) comprising:
   a plurality of crystal grains,
   wherein each of the plurality of crystal grains has a lamination structure in which a plurality of plate-shaped crystals are laminated, and
   particle sizes of the plurality of crystal grains are uniform on a microscale,
   each of the particle sizes of the plurality of crystal grains is distributed in a range of 0.1 µm to 20 µm, and a relative particle amount $q_3$ shows the maximum value in a range of the particle size of 4 µm to 4.8 µm, $$[Ni^{2+}{}_{1-x}Fe^{3+}{}_x(OH)_2]\cdot[(Cl^-)_{x/2}] \qquad (1),$$

where, $0.25 < x \leq 0.9$.

2. The layered double hydroxide crystal according to claim 1, wherein
   an interlayer space is formed between adjacent plate-shaped crystals, and
   the plurality of plate-shaped crystals and a plurality of the interlayer spaces are alternately arranged.

3. An anion adsorbent comprising the layered double hydroxide crystal according to claim 1.

4. The anion adsorbent according to claim 3, wherein the anion adsorbent adsorbs one or two or more kinds of anions selected from the group consisting of fluoride ions, sulfate ions, and arsenide ions.

5. A method for producing the layered double hydroxide crystal of claim 1 comprising:
   A step of preparing, as a raw material, a mixture of a Ni source substance, a Fe source substance, and a Na source substance which are mixed based on a precursor crystal stoichiometric proportion;
   A step of heating the raw material at 600° C. to 1000° C. for 1 hour or longer to produce precursor crystals composed of $NaNi_{1-x}Fe_xO_2$ crystals ($0.25 < x \leq 0.9$);
   A step of hydrolyzing the precursor crystals;
   A step of carrying out a reduction treatment on crystals obtained by the hydrolysis of the precursor crystals; and
   A step of substituting a carbonate ion positioned on an interlayer between the crystals obtained by the reduction treatment with a chloride ion.

* * * * *